United States Patent
Maser et al.

(10) Patent No.: US 6,224,919 B1
(45) Date of Patent: May 1, 2001

(54) BLACK COLLAGEN FLAT FILM AND FOODSTUFF COATED THEREWITH

(75) Inventors: Franz Maser, Mannheim; Mathias Göhrig, Hirschberg; Bernd Peiffer, Dielheim, all of (DE)

(73) Assignee: Naturin GmbH & Co., Weinheim (DE)

( * ) Notice: Subject to any disclaimer, the term of this patent is extended or adjusted under 35 U.S.C. 154(b) by 0 days.

(21) Appl. No.: 09/325,181

(22) Filed: Jun. 3, 1999

(30) Foreign Application Priority Data

Jun. 5, 1998 (EP) .................................................. 98500134

(51) Int. Cl.$^7$ ....................................................... A23L 1/314
(52) U.S. Cl. ............................. 426/92; 426/140; 426/250; 426/657
(58) Field of Search ............................. 426/92, 105, 140, 426/250, 262, 657

(56) References Cited

U.S. PATENT DOCUMENTS

| | | | | |
|---|---|---|---|---|
| 3,961,082 | * | 6/1976 | Winkler | .............................. 426/140 X |
| 5,274,078 | * | 12/1993 | Wada et al. | ........................... 530/356 |

* cited by examiner

*Primary Examiner*—Arthur L. Corbin
(74) *Attorney, Agent, or Firm*—Notaro & Michalos P.C.

(57) ABSTRACT

A black edible flat film based on collagen with a wall thickness of up to 40 microns that comprises (a) a collagen substrate, and (b) at least one black pigment and wherein the concentration of said pigment is between 2% and 40% by weight based on dry collagen in order to meet the requirements of suppleness and non-transparency. These films are useful in the manufacture of foodstuffs having a black outer coating.

10 Claims, No Drawings

BLACK COLLAGEN FLAT FILM AND FOODSTUFF COATED THEREWITH

BACKGROUND OF THE INVENTION

This invention relates to a flat edible food film based on collagen and to a foodstuff comprising said film.

Collagen is the generic term for a family of proteins which can be found in any multicellular organism. To date, about 20 different types of collagen have been described in literature. From the conformational standpoint this variety is the result of the combination of triple helical domains with globular, non-helical domains. As a consequence of the structural differences on the molecular level, the individual types of collagen aggregate into different macroscopic structures. Therefore, literature differentiates between a group of "fibril forming collagens" and other collagens (e.g. fibril associated collagens, collagens forming sheets, beaded filaments or anchoring fibrils).

Edible collagen films are well known in the art. They are used world-wide as edible wrappings of food like, for example, ham, poultry and fish products. The preparation of such collagen films has been described, for example, in DE 642 922 or DE 19970403. Their application as edible wrappings for food has been addressed, inter alia, in DE 19 45 527. Their use in wrapping meat products is known from U.S. Pat. No. 3,014,024 and CA-1.253.387 teaches the use of these collagen films for wrapping fish products.

Collagen films with specific additional functions and, therefore, containing functional ingredients incorporated into the basic film, are known from DE-PS 970 263 (film containing soluble colourants and/or soluble aroma components) and WO 95/17100 (collagen film with finely ground spices embedded as integral ingredients).

The collagen films mentioned above represent tools which have provided significant improvement and help in a vast variety of food manufacturing processes. However, there are still processes in food industry which, to date, must be considered unsatisfactory. One of such example is the manufacture of "Black Forest ham", a product most popular in the Canadian food market. The problematic step in the manufacturing process of Black Forest ham is the blackening of the surface of the processed meat.

At present, different blackening technologies are applied by the different manufacturers. Some use high density pine needle and pine wood smoke. This method, however, creates deposits of tar and creosote which build up in the smoke generators and houses, causing serious fire hazards. Moreover, the black coating formed on the product has a tendency to leach into the vacuum package when stored in refrigerated condition.

An effective, but for obvious reasons unpopular method, is to dip the netted hams into beef blood and bake the blood onto the hams. By the additional treatment with high density, high humidity smoke the desired black outer coating forms on the surface of these hams.

Most Canadian companies are known to use hot caramel solution to blacken their hams. However, numerous negative side effects are related with the application of this method:

- in general, the hot solution is applied in refrigerated production areas causing condensation of steam and rise of temperature in such zones;
- as the netted hams have to be submerged completely in the hot caramel solution, the operator dipping the hams experiences discomfort to his glove protected hands. In contact with skin and nail beds the caramel acts as a colourant;
- after the dipping step the hams are placed on smoke racks where 50% of the caramel coating tends to drip off. This run off ends up on the floor and in the drain causing an extra load on the waste water treatment system, not to mention the expense related with this loss of caramel solution;
- the hot caramel solution has the tendency to migrate into the meat As a consequence, when the finished product is sliced the outer layer of the ham shows a smudgy dark half inch ring which looks anything else but attractive; and
- when handled by the counter staff or when in contact with other meats in the counter the black coating of the ham comes off. This causes very messy working conditions and contamination of other deli products as well as the slicing equipment.

In the Canadian market more than 50% of the hams are sold as half hams (cut in half after processing). However, to date there are no "Black Half Hams" available since the present manufacturing methods do not permit to market such a product. The Black Forest ham, cut in half and vacuum packed, would have the fresh cut surface spoilt with black caramel, making the product look messy.

Another technique applied to blacken a ham wrapped with an edible collagen film is to dip the netted ham into the solution of a specific kind of liquid smoke (Maillose, supplied by Red Arrows) and, in a second step, expose the product for six hours to a high humidity dense smoke. The resulting product, however, does not truly fulfil the criteria of a Black Forest ham. At best, the surface may be called "brown" or "dark greyishbrown". In addition, in the smoke cycle a huge excess of smoke must be applied which is very costly to the operator and smoking has always some environmental restrictions.

Therefore, there is a need of a simplified manufacturing process which overcomes the above-mentioned limitations in processing Black Forest ham or other foodstuffs with a black outer coating.

SUMMARY OF THE INVENTION

The goal of the present invention is, therefore, to develop a modified edible flat collagen film suitable to simplify the manufacturing process for Black Forest ham or other foodstuffs with a black outer coating and to improve the adherency of the black coating to the products concerned.

This requirement is met by a newly developed black edible flat collagen film which, before processing, can be wrapped around the foodstuff to be blackened and which after processing remains on the outer surface of the finished product as an integral product component, thus providing said product with a black surface. The resulting product does not "leach out under vacuum" and does not contaminate neither slicing equipment, hands of service personnel nor other meat products which it may get in contact with in the deli counter. Finally, making use of the invention the manufacturing process is revolutionized by eliminating messy dipping procedures with colouring solutions and avoiding the need of rigorous smoke treatments.

The invention refers to a flat black edible film based on collagen comprising (a) a collagen substrate, and (b) at least one black pigment, wherein the wall thickness of the film is equal or lower than 40 microns and the concentration of said pigments is between 2% and 40% by weight based on dry collagen, preferably, between 5% and 15% by weight based on dry collagen.

DETAILED DESCRIPTION OF THE INVENTION

The collagen substrate is based on fibril forming collagens, regardless of the origin of the tissue from which the collagen is recovered. However, there are sources which are particularly favourable for the recovery of collagen from the point of view of availability, tissue architecture and economy. One of such sources is bovine hide. For this reason, the examples presented below are based on the use of bovine hide collagen. However, it must be emphasised that the invention is not limited to bovine collagen nor to the use of native collagen since chemically or enzymatically modified fibril forming collagen(s) can also be suitable substrates.

Black pigments useful for the present invention should meet the three basic requirements for the colour component of a black edible collagen film used in the manufacture of foodstuffs with a black outer coating. Said requirements are:

it must comply with the applicable legal food regulations;

it must not get extracted from the collagen film during foodstuff processing or during storage in the vacuum package; and it must not transmit any strange sensorial properties to the final product.

Any black pigments which meet the above mentioned requirements can be used in the manufacture of the film provided by this invention. Representative of said pigments are black iron oxide pigments, carbon black and charcoal. Applicable regulations to pigments may vary from one country to another, although these three black pigments are generally accepted from this point of view for the purpose of the invention.

In a particular embodiment, said pigment is a black iron oxide pigment comprising ferrosoferric oxide [The Merck Index, 11th Edition, 1989, Monograph 3988].

The use of iron oxide pigments for dyeing edible food coatings is not new. For example, some commercially available coloured tubular collagen casings contain iron oxide pigments. However, the quantity of iron oxide pigments used in the manufacture of such tubular casings is limited due to the fact that said pigments exert a coagulating effect when added to the collagen gel, stimulating the reconstitution of collagen fibrils. This, in turn, causes severe extrusion problems since the fibrils formed partially plug the extrusion nozzle. As a consequence, the concentration of iron oxide pigments found in commercially available collagen casings generally is below 2% by weight (based on dry collagen).

The wall thickness of a collagen film designed for use in, for example, Black Forest ham manufacture, however, must be significantly lower than that of an edible tubular sausage casing because the film should surround the meat in a highly supple way and must not perform in a stubborn way.

On the other hand, low wall thickness along with low concentrations of the black iron oxide pigment would lead to a film with fairly high transparency. To obtain a final product with a "Well blackened" appearance, however, the film must not be transparent. Therefore, to meet both requirements (suppleness and non-transparency) the film must be thin and contain a high concentration of black iron oxide pigments.

Unexpectedly, it has been found that the phenomenon of coagulation and fibril reconstitution outlined above and well known from gel preparation in the course of tubular collagen casing manufacture is not observed in the manufacture of a black collagen flat film if dyeing of the collagen gel is carried out as disclosed in Examples 1 or 2. The reason for this unexpected behaviour is not clear to date. Possibly it is due to the fact that the collagen content of masses for collagen flat film manufacture (about 2%) is significantly lower than that for tubular casing manufacture (4,5%–12%). But the detailed mechanisms on a molecular level are not elucidated, so far. Another explanation could be a different behaviour of collagen mass when extruded in a flat or tubular form.

Astonishingly, if the collagen mass is dyed according to the processes disclosed in Examples 1 and 2, a concentration ratio of 1:3 (iron oxide:dry collagen, wt/wt) could easily be achieved without observing coagulation effects or problems in extrusion. However, such high concentration of black pigment in the film is not even required: a suitable level of non-transparency of the film for application in Black Forest ham manufacture was already found to be reached at a concentration ratio of 1:10 (iron oxide:dry collagen, wt/wt).

There are, at least, three potential ways to dye a collagen flat film with said black pigments. The most simple approach is to admix the pigments with the mass batch directly in the course of the preparation of the collagen gel.

Another option is to prepare a slurry of the pigments in a separate manufacturing step. In said slurry the pigments are "homogeneously" dispersed in the gel of a suitable hydrocolloid which prevents precipitation of the pigments. In Example 1 gelatin is the hydrocolloid chosen, whereas in Example 2 methyl cellulose is made use of. However, numerous gels of other hydrocolloids (exudates like tragacanth, seed flours like guar gum, extracts from plants and algae like pectins or carragheen, microbial polysaccharides like xanthan, or modified polysaccharides like cellulose derivatives) have turned out to fulfill the same function when properly prepared and adjusted with respect to solids content and pH value. The slurry of pigments is hereinafter referred to as "pigment slurry".

In a second step the pigment slurry can then be admixed with the collagen gel prepared in parallel. A batch of black coloured collagen mass is obtained as a result (see Example 1).

In a more favourable approach the pigment slurry is injected into the flow of the collagen gel short before it reaches the extrusion nozzle. To assure a "homogeneous" distribution of the pigments in the collagen film the joint gels of the pigment slurry and the collagen paste are passed through a series of dynamic mixers. The extrusion of the resulting mixture onto a conveyor belt occurs in a way known to those skilled in the art.

The black edible film based on collagen provided by this invention is useful in the manufacture of foodstuffs having a black outer coating, such as processed meat, for example, Black Forest ham.

EXAMPLES

The invention is further illustrated in more detail with respect to the production of the black collagen film as well as its application in the manufacture of Black Forest ham by means of the following examples.

Example 1

500 kg of a collagen mass with a collagen content of 2.0% and a composition disclosed in Example 2 of DE 19640019 are prepared under standard manufacturing conditions known in the art. The resulting mass is introduced into a kneader equipped with a cooling jacket. The temperature of the collagen paste is 10° C.±2° C.

In parallel, a pigment slurry is prepared according to the following procedure: In a volume of 11.0 l of hot water (45° C.) 1.11 kg of black iron oxide pigment (Sicovit(TM) black 85, BASF) are dipersed by means of a high shear stirrer (Ultra-Turrax, IKA-Werk). While stirring, 5.5 kg of gelatin (80 bloom) are added until the slurry has a homogeneous appearance. The pH of the slurry is adjusted with HCl to pH 2.9. The pigment slurry is then allowed to cool down under gentle stirring with a propeller mixer.

When the pigment slurry has reached a temperature of 20° C. it is slowly admixed to the collagen mass batch in the kneader. To achieve a uniform distribution of the pigment slurry in the collagen paste the pigment slurry is added slowly over a period of time of 1 hour, while the kneader is in operation.

The black gel obtained is pumped from the kneader through a deaerater to a vessel equipped with a cool jacket, stored for 24 hours and then extruded onto a conveyor belt which passes through a tunnel dryer. At the end of the dryer the black film obtained is reeled.

Example 2

500 kg of a collagen paste with a collagen content of 2.0% and a composition disclosed in Example 3 of DE 19640019 are prepared under standard manufacturing conditions known in the art. In parallel, a pigment slurry is prepared according to the following procedure: 1,000 g of iron oxide pigments (Sicovit(TM) black 85, BASF) are introduced under vigorous stirring (Ultra-Turrax, lKA-Werk) into a suitable vessel containing 10.0 l of tap water (10° C.–20° C.). Gradually, 150 g of methyl cellulose (Tylose MH 3000, Hoechst) are added. Once a homogeneous distribution of all components is obtained, the pH value is adjusted with HCl to pH 2.9. Then, for deaeration, the slurry is very gently stirred for 14 hours by means of a propeller mixer with the propeller blade close to the bottom of the vessel.

The collagen gel prepared in the first step is pumped to the extrusion nozzle. Right in front of the extrusion nozzle the gel passes through a series of three dynamic mixers (Gesellschaft für Technische Automatisierung mBH). At the inlet of the first mixer the pigment slurry (1 part [weight]) is introduced into the mass flow of the collagen gel (50 parts [weight]). At the outlet of the third mixer the distribution of the pigment slurry in the collagen gel is even and the resulting mass passes through the extrusion nozzle onto a conveyor belt which is led through a tunnel dryer. At the end of the dryer the black film obtained is reeled.

Example 3

20 kg of primal ham cuts are trimmed of all internal fat and gristle as well as part of the external fat. Insides, outsides and knuckles are cut apart. Ham muscles are free of any silver skins and mechanically tenderized to increase the external surface of the meat. The trimmed primal cuts are injected with brine solution (containing salt, nitrite, phosphate, erythorbate, sugars, and seasonings), thus increasing their weight by about 30%. The injected meat pieces are tumbled at 4° C. for 9 h under vacuum at its maximum level. After 8 hours the tumbling process is interrupted for the addition of 1.6 kg of 2 mm ground shank. Then, tumbling is continued for one more hour. After the tumbling process has come to the end, the resulting hams are left in the tumbler for additional 2 hours.

The massaged meat is next stuffed into 57 cm wide black collagen film resulting from Example 1 and netted, using a semi-automatic Ham Stuffer System (Brechteen Company) which permits simultaneous stuffing, wrapping and netting. The outer muscle, outside fat down, is loaded into the machine cavity first. The rest of the meat is added as lean meat only. The stuffed products are received by an operator who shuts the first end by clipping, works the meat from the open end to the closed end to shape the ham to its desired form and closes the second end as the way the first one was shut.

The individual hams obtained have a weight of about 4–4.5 kg. They are hung on a rack by one end to create a pear shaped end product. A space of 5 cm between the individual hams allows for good air circulation and uniform cooking/smoking. The rack with the hams is introduced into the smokehouse in which the subsequent smoke and cook cycle is applied:

| Time (Min) | Temperature (° C.) | Rel. Humidity (%) | Smoke |
|---|---|---|---|
| 120 | 60 | 60 | off |
| 120 | 70 | 55 | on |
| 30 | 75 | 0 | off |
| Until internal temperature has reached 71° C. | 78 | 80 | off |

At the end of the cook cycle the products are cooled by air cooling. When the internal temperature has dropped below 60° C. the nettings are removed. The black collagen film has essentially turned into an integral component of the ham and the surface of the hams looks blackened similar to the one known from standard Black Forest hams. As soon as the nettings are removed, the hams are vacuum packed.

Example 4

The process is essentially identical to the one disclosed in Example 3, with a few minor changes:

only small whole hams (2.5 kg) are processed using black collagen film from Example 2 with a width of 40 cm;

in the cook cycle no smoke is applied in any of the cycle steps; and after removal of the netting the hams are cut into halves and vacuum packed. The cross-sections of the halves look very appetising.

In contrast to halves of Black Forest ham manufactured according to the old art (where migration of the blackening components into the meat spoils the eye-appeal of the cross-section), the halves do not show any smudgy zone near the edges.

It has been found that pigment concentrations above 40% by weight based on dry collagen influence the bite and flavour of the product in an undesirable manner making it not suitable for the purpose of wrapping the food.

What is claimed is:

1. A black collagen flat film comprising a collagen substrate dyed with a black pigment, said film having a wall thickness equal to or lower than 40 microns and said pigment being present in a concentration of between 2% and 40% by weight based on dry collagen.

2. A collagen flat film according to claim 1, wherein the concentration of said pigment is between 5% and 15% by weight based on dry collagen.

3. A collagen flat film according to claim 1 wherein the wall thickness of said film is between 15 microns and 25 microns.

4. A collagen flat film according to claim 1, wherein said collagen substrate comprises native fibril forming collagen.

5. A collagen flat film according to claim 1, wherein said collagen substrate comprises chemically and/or enzymatically modified fibril forming collagen.

6. A collagen flat film according to claim 1 wherein said black pigment comprises black iron oxide pigment.

7. A collagen flat film according to claim 1 wherein said black pigment comprises carbon black.

8. A foodstuff having a black outer coating comprising a black edible film based on collagen according to claim 1.

9. A foodstuff according to claim 8, wherein said foodstuff is processed meat.

10. A foodstuff according to claim 8, wherein said foodstuff is Black Forest ham.

* * * * *